United States Patent [19]
Crosby

[11] 4,337,151
[45] Jun. 29, 1982

[54] METHOD AND APPARATUS FOR PULSED TIMED CONTROL FOR SLUDGE RETURN LINE

[75] Inventor: Gary A. Crosby, New Iberia, La.

[73] Assignee: Red Fox Industries Inc., New Iberia, La.

[21] Appl. No.: 220,775

[22] Filed: Dec. 29, 1980

[51] Int. Cl.$^3$ ............................................... C01C 1/26
[52] U.S. Cl. .................................. 210/139; 210/195.3; 210/221.2
[58] Field of Search ...................... 210/138, 139, 195.3, 210/197, 207, 218, 227.2, 320

[56] References Cited

U.S. PATENT DOCUMENTS

| | | | |
|---|---|---|---|
| 2,901,114 | 4/1957 | Smith et al. | 210/200 |
| 3,342,727 | 9/1967 | Bringle | 210/15 |
| 3,355,019 | 11/1967 | Mitchell | 210/104 |
| 3,382,981 | 5/1968 | Hampton | 210/142 |
| 3,487,937 | 1/1970 | Koulovatos | 210/195 |
| 3,522,881 | 8/1970 | Nicol | 210/127 |
| 3,721,344 | 3/1973 | Rost | 210/104 |
| 3,722,836 | 3/1973 | Savage | 261/1 |
| 3,767,051 | 10/1973 | Thompson | 210/197 |
| 3,807,563 | 4/1974 | Reid, Jr. | 210/139 |
| 3,884,815 | 5/1975 | Cornelissen | 210/521 |
| 3,992,299 | 11/1976 | Wray | 210/152 |
| 4,036,754 | 7/1977 | Peasley | 210/139 |

Primary Examiner—John Adee
Attorney, Agent, or Firm—Wilkinson, Mawhinney & Theibault

[57] ABSTRACT

The present disclosure is directed to a method and apparatus for reducing eddy currents in a clarifier to restrict sludge from entering the clear water zone of the clarifier by periodically pulsing air to the sludge return line from the bottom of the clarifier to the top of the aeration chamber in a sewage treatment plant of both the land base and marine type.

1 Claim, 1 Drawing Figure

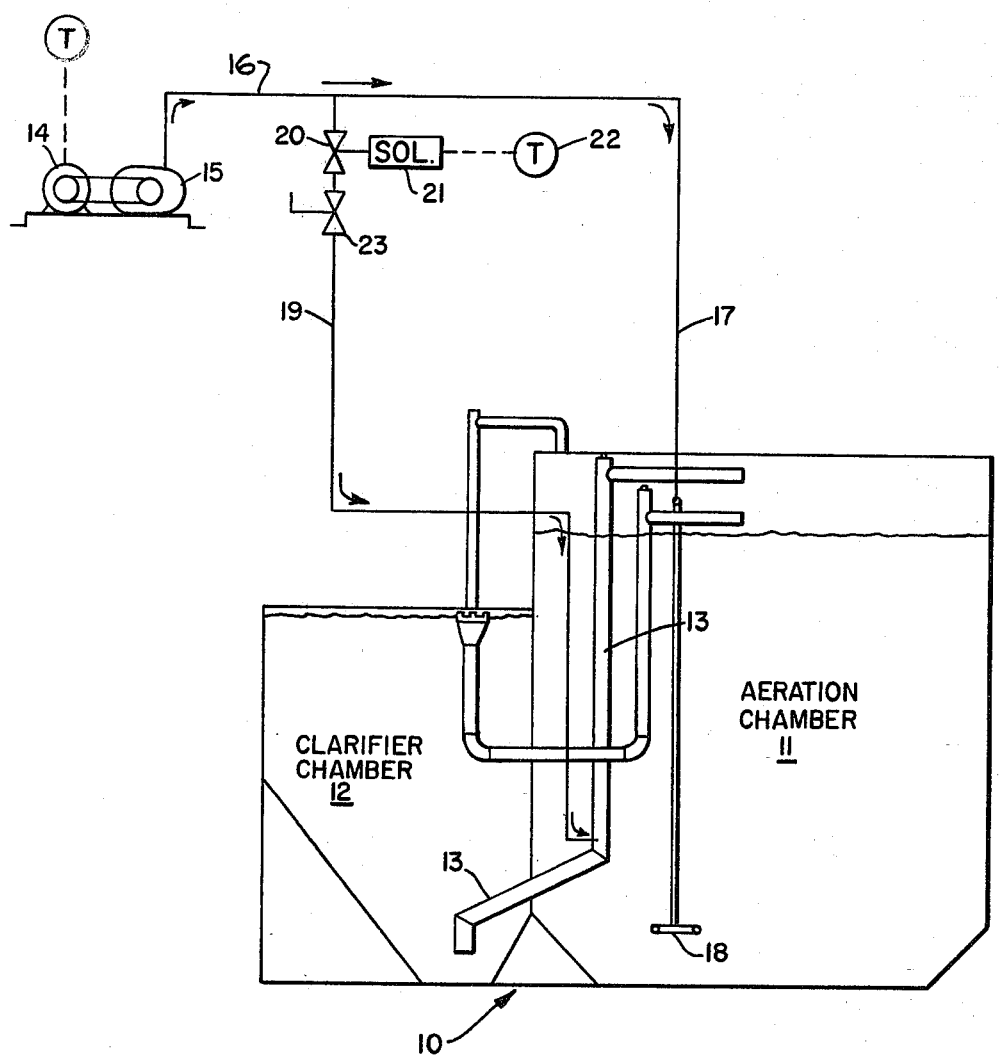

METHOD AND APPARATUS FOR PULSED TIMED CONTROL FOR SLUDGE RETURN LINE

TECHNICAL FIELD

My invention relates to periodically pulsing with air the sludge return line between the bottom of the clarifier and the aeration chamber in a sewage treatment apparatus both land base and marine.

Control of the solids settling in the clarifier and separation efficiency in the clarifier is significantly improved if the sludge return line is operated for short periods of time reducing the amount of liquid recirculated through the clarifier. Prolonged operation of the sludge return line induces eddy currents in the clarifier that cause sludge to flow into the clear water zone of the clarifier.

BACKGROUND ART

This apparatus is intended for use with the type sewage treatment unit shown and described in U.S. application Ser. No. 082,964, filed Oct. 9, 1979, now U.S. Pat. No. 4,253,957, which may have both marine and land base applications.

Of particular interest are the disclosures which deal with sewage treatment apparatus having sludge return lines. The following are relevant U.S. Pat. Nos.:

2,901,114 Smith et al
3,487,937 Koulovatos
3,722,836 Savage et al
3,767,051 Thompson
3,884,815 Cornelissen
3,992,299 Wray.

Also background art includes the following U.S. Pat. Nos.:

3,342,727 Bringle
3,355,019 Mitchel
3,382,981 Hampton
3,522,881 Nicol
3,721,344 Rost
3,807,563 Reid Jr.

DISCLOSURE OF THE INVENTION

In accordance with my invention I modify the air supply system to the apparatus by tapping off the air supply to the diffusers line to provide a service air line to the sludge return line in the bottom region of the clarifier chamber. A solenoid control valve and an adjusting air flow metering regulator valve controls the air flow to the sludge return line while a timer controls operation of the solenoid control valve so that, by way of example, plusing air to the sludge return line may be supplied for from 1 to 3 minutes per hour depending upon the size of the unit. This is to avoid prolonged operation of the sludge return line which induces eddy currents which unduly disturb the clear water zone of the clarifier.

BRIEF DESCRIPTION OF DRAWINGS

FIG. 1 is a schematic of a sewage treatment apparatus having an aeration chamber and a clarifier chamber with a sludge return line therebetween modified in accordance with the present invention.

BEST MODE FOR CARRYING OUT INVENTION

Referring now to the drawing, 10 designates generally a sewage treatment plant of the type shown in U.S. Ser. No. 082,964, filed Oct. 9, 1979, now U.S. Pat. No. 4,253,957, having an aeration chamber 11 and a clarification chamber 12. A sludge return line 13 runs from the bottom of the clarifier 12 to the top of the aeration chamber 11 for returning sludge which has settled out in the clarifier to the aeration chamber for recycling.

A motor 14 drives a pump 15 which supplies air to an air service line 16, one branch of which 17 supplies air to the diffusers 18 in the aeration chamber 11 while the other branch 19 supplies air to the sludge return 13. The air to the sludge return is gated by a valve 20 controlled by a solenoid 21 under control of a timer 22 which will periodically pulse air to line 13, by way of example every one to three minutes per hour depending on the size of the unit. This will reduce the amount of liquid recirculated through the clarifier. Prolonged operation of the sludge return line 13 also induces eddy currents which cause sludge to flow up into the clear water zone of the clarifier 12.

Also located in the branch line 19 downstream of solenoid controlled valve 20 is a metering valve 23 to regulate the quantity of air to the sludge return line once the valve 20 is opened by the solenoid.

This apparatus is employed with both land base and marine sewage treatment installations.

The method of periodically pulsing the sludge return line to control sediment in the clarifier is also believed to be novel as well as the structure for effectuating same. I have determined that separation efficiency in the clarifier is significantly improved if the sludge return line is only operated for a few minutes. In our prior arrangement shown in application Ser. No. 082,964 the sludge return line operated whenever the blower was running which resulted in too much eddy current generation which caused clouding of the clear water zone of the clarifier.

What I claim is:

1. In a sewage treatment apparatus, an aeration chamber, a clarification chamber having a clear water zone, a sludge return line extending from the bottom of said clarification chamber to the top of said aeration chamber, an air service line supplying air from a blower to a lower portion of said sludge return line, apparatus for periodically pulsing air to said sludge return line comprising a solenoid controlled valve in said air service line to said sludge return line, timing means for periodically pulsing the air to said sludge return line so that eddy currents in the clarification chamber are reduced to retard flow of sludge into the clear water zone of the clarifier, and a metering valve downstream of said solenoid controlled valve to regulate the quantity of air supplied to said sludge return line when said solenoid controlled valve is opened.

* * * * *